OR 3,736,374

United States Patent [19]

Gargini

[11] 3,736,374

[45] May 29, 1973

[54] WIRED BROADCASTING SYSTEMS

[75] Inventor: Eric J. Gargini, West Drayton, England

[ * ] Notice: The portion of the term of this patent subsequent to Sept. 15, 1989, has been disclaimed

[73] Assignee: Communications Patents Limited, London, England

[22] Filed: June 2, 1970

[21] Appl. No.: 42,772

[30] Foreign Application Priority Data

June 3, 1969 Great Britain....................27,927/69

[52] U.S. Cl................178/6, 178/DIG. 13, 179/1 B, 179/170 D, 333/6

[51] Int. Cl...........................................H04n 7/10

[58] Field of Search..............................178/DIG. 13; 325/308; 179/170 D, 1 B; 333/6, 8, 11

[56] References Cited

UNITED STATES PATENTS 3,244,809 4/1966 Fuller et al..........................179/1 B

FOREIGN PATENTS OR APPLICATIONS 100,604 1/1941 Sweden..................................333/6

*Primary Examiner*—Robert L. Griffin
*Assistant Examiner*—Joseph A. Orsino, Jr.
*Attorney*—Laurence R. Brown

[57] ABSTRACT

A hybrid coupling transformer system is used in wired broadcasting systems with two transformers coupled through a pair of series windings on the respective transformers carrying TV signals. A second winding is coupled in series anti-phase and output windings are coupled to subscriber stations. Audio signals are separately connected in some embodiments to center-topped output windings.

6 Claims, 2 Drawing Figures

No DATA

WIRED BROADCASTING SYSTEMS

Figure 1:
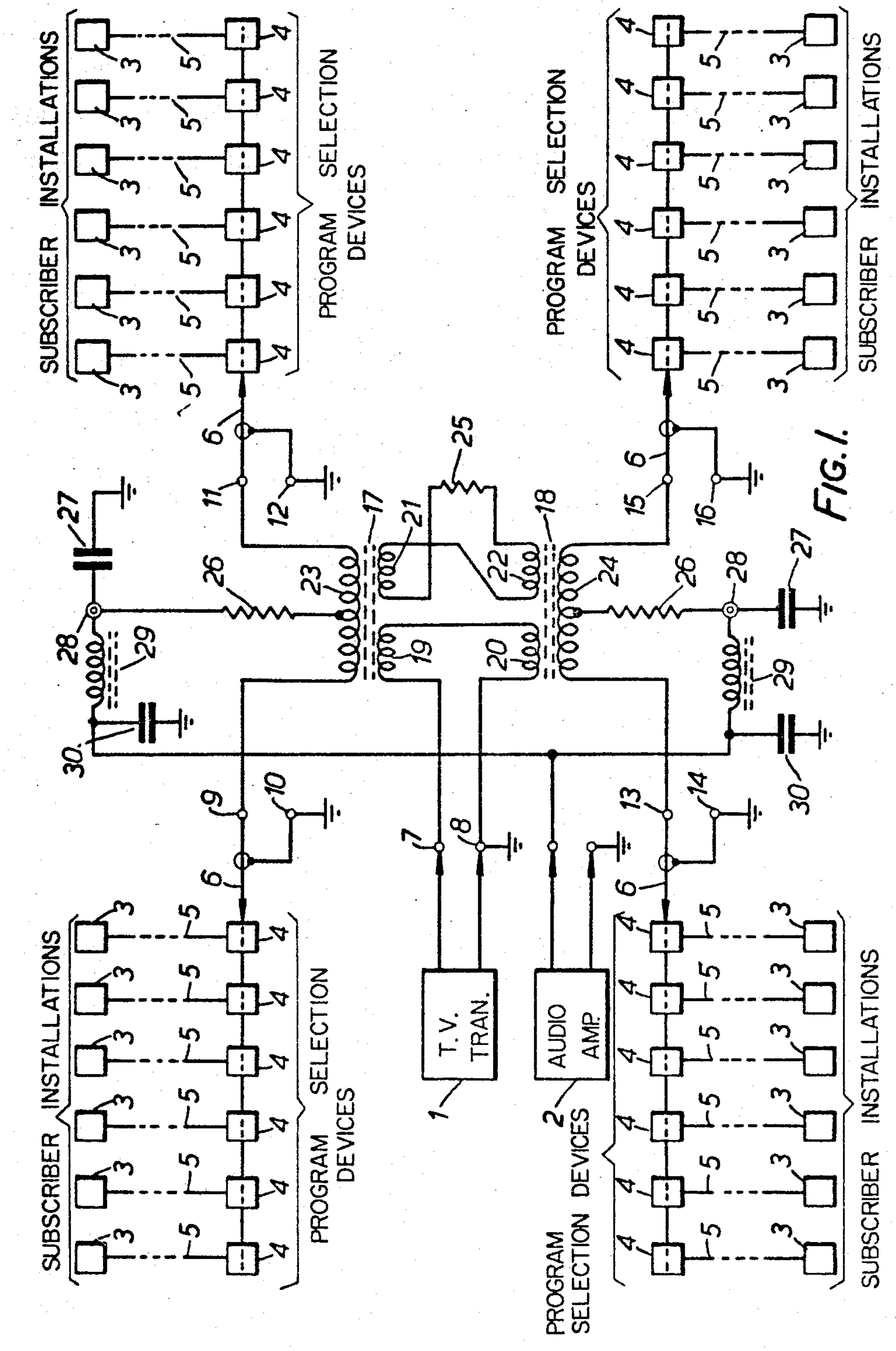

This invention relates to wired broadcasting systems and seeks to provide an improved form thereof.

In wired broadcasting systems of the kind in which a large number of programmes is made available to the subscribers of said system it is convenient, and desirable in the interests of subscriber to subscriber isolation, to provide a large number of outputs in respect of each programme source, each output being capable of serving a small group of the subscribers connected to the programme exchange. It is an object of the invention to provide a hybrid system suitable for this purpose.

Accordingly the invention provides a wired broadcasting system including a hybrid arrangement having a pair of input terminals and four pairs of out put terminals which includes two transformers each having a first winding, a second winding and a third, tapped, winding, the first windings of said transformers being connected in series between the pair of input terminals, the second windings being connected in series antiphase between the terminals of an impedance and the third windings each being connected between one of each of a corresponding two of said four pairs of output terminals, the other terminal of each of said four pairs being connected to a common conductor, the tapping point of each third winding being connected to said common conductor through two impedences is series one of which has an impedance which is appreciable in the audio frequency range but is low in the high frequency range, and means for connecting in shunt with said one impedance an audio frequency signal source.

Preferably, the audio frequency source is connected to said one impedance through a high frequency filter arrangement. Further, it is electrically convenient if said one impedance is arranged to have one of its terminals connected to the common conductor so as to simplify the connection thereto of the audio frequency signal source.

The invention also provides a wired broadcasting system in which the audio frequency signal source is applied to the input terminals of the hybrid arrangement and is coupled to its output terminals by means which include an impedance arranged in series with the input terminals which is appreciable over the audio frequency range but low in the high frequency range and a connection extending between said impedance and the junction between the series pairs of impedences connected between the tapping point on the third windings and the common conductor.

In a practical construction of a hybrid arrangement referred to in the preceding paragraph the impedance in series with the input terminals can have one of its terminals connected to the common conductor thereby also simultaneously to form one of those associated with the high frequency filters through which the audio frequency signals are applied across said one impedences. These latter impedences may also have one terminal connected to the common conductor and each form a further part of the corresponding high frequency filter.

The invention further provides a wired broadcasting system which includes a hybrid arrangement having associated with at least one of the output terminals thereof an impedance transformer the output impedance of which is arranged to feed the input terminals of a further hybrid arrangement, the impedance transformer having connected in series with its primary winding an impedance which is low in the high frequency range but is high in the audio frequency range, whilst its secondary winding is connected between an auxiliary output terminal and one of the junctions between the pairs of series impedences associated with the tapped third windings of a hybrid transformers.

Figure 2:
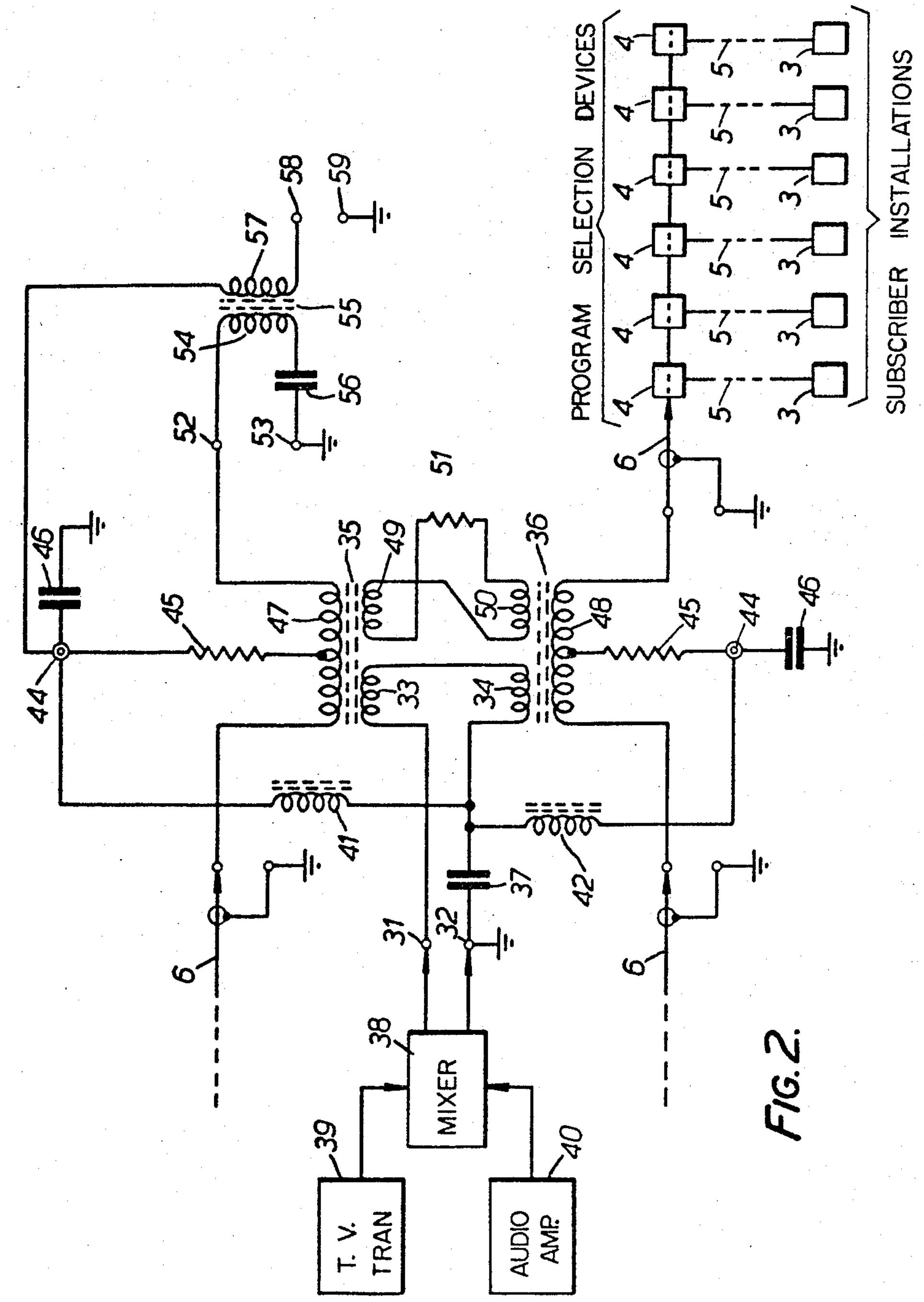

In order that the invention may be more readily understood one particular embodiment thereof will now be described by way of example only, with reference to the accompanying drawings in which:

FIG. 1 is a schematic drawing of part of a wired broadcasting system in accordance with the present invention, and FIG. 2 is a schematic drawing of part of another form of wired broadcasting system in accordance with the present invention.

In FIG. 1 a television transmitting apparatus 1, and an audio frequency amplifier 2, are arranged at a programme exchange to provide the picture and accompanying sound signals in respect of one of a plurality of television transmissions which are to be made available to the subscribers of said system who are provided with suitable subscriber's installations 3. The subscribers are arranged to be connected to the programme exchange in small groups, each group consisting, in the example shown, of six subscribers. Each subscriber is provided at the programme exchange with a corresponding programme selection device 4 by means of which a signal line, shown diagrammatically at 5, which extends from the programme exchange to the subscriber can be connected to a desired one of a plurality of signal highways 6, one of which is provided in respect of each programme for each group of subscribers. Each signal highway is arranged to carry the high frequency vision signals together with the corresponding audio frequency sound signals and these signals are derived from the vision transmitter 1 and sound amplifier 2 by means of a hybrid arrangement.

This hybrid arrangement has a pair of input terminals 7, 8, and four pairs of output terminals 9/10, 11/12, 13/14, and 15/16 to each of which is connected a signal highway 6. The hybrid arrangement includes two transformers 17, 18, each of which has a first winding 19, 20, a second winding 21, 22, and a third, tapped, winding 23, 24. The first windings 19, 20, are connected in series between the input terminals 7, 8, whilst the second windings 21, 22, are connected in series anti-phase across an impedance 25 which usually will comprise a resistor having a resistance corresponding to the characteristic impedance which the hybrid system is designed to present between the input terminals 7, 8. The third windings 23, 24, are each connected between corresponding ones 9, 11 and 13, 15, of a corresponding two pairs of the four pairs of output terminals. One terminal 10, 12, 14, and 16, of each pair is connected as shown to a common conductor. The tapping point of each third winding 23, 24, is connected to the common conductor through two impedences 26, 27, which are arranged in series. The impedences 27 which have one terminal connected to the common conductor are formed by capacitors having a value such that their impedance in the audio frequency range is appreciable but is low in the high frequency range. The terminal 28 is provided at the junction of the impedences 26 and 27 to enable the audio frequency signal source formed by the amplifier 2 to be connected in shunt with the impedences 27. Preferably, the audio frequency source is connected to the terminals 28 through a high frequency filter arrangement formed, for example, by the inductors 29 and capacitors 30.

It will be appreciated that only one high frequency filter need be provided in a practical construction and that the capacitors 27 could be formed by a single capacitor instead of the two separate capacitors shown.

A development of the wired broadcasting system in FIG. 1 is shown in part, in FIG. 2. in this Figure the input terminals 31, 32, of the hybrid arrangement have connected in series between them the first windings 33, 34, of the two transformers 35, 36, together with a capacitor 37 which has a value such that its impedance is appreciable over the audio frequency range but is low in the high frequency range. The input terminals are fed from a combining network 38 which is arranged to combine high frequency vision signals provided by a television transmitter 39 with corresponding audio frequency sound signals provided by an audio amplifier 40 so that both said high frequency and audio frequency signals are simultaneously present at the input terminals 31, 32. By the series connection of the windings 33, 34, and the capacitor 37, the high frequency vision signals are allowed to pass through said windings substantially unimpeded whilst an audio frequency potential is developed across the capacitor 37. This audio frequency potential may be fed through the high frequency chokes 41, 42, to corresponding terminals 44 which are located at the junction of series pairs of impedences 45, 46, which are connected between the tapping points on the third windings 47, 48, and the common conductor. The second windings 49, 50, of the transformers 35, 36 are connected in series anti-phase across the terminals of the impedance 51 which is similar to the impedance 25 in FIG. 1.

In the arrangement shown in FIG. 2 it will be appreciated that the capacitors 37 and 46 serve two purposes, one to provide an audio frequency impedance and two, to form, in association with the inductors 41, 42, a high frequency filter arrangement.

One pair 52/53 of the four pairs of output terminals of the hybrid arrangement shown in FIG. 2 is connected to the primary winding 54 of an impedance transformer 55 through a series impedance formed by a capacitor 56 which has a value such that its impdence is low in the high frequency range but high in the audio frequency range so as substantially to prevent the passage of audio frequency signals through the primary winding 54. The secondary winding 57 of the transformer 55 is connected between an output terminal 58 of a pair of terminals 58/59 and one of the terminals 44, whilst the remaining output terminal 59 of said pair is connected to the common conductor. There is thus made available between the terminals 58, 59 combined high frequency vision and audio frequency sound signals in respect of the television programme applied to the input terminals 31, 32. The impedance presented between said terminals 58, 59, is preferably chosen to match that required by the input terminals 31, 32, of a similar hybrid arrangement so that the output signals provided may be split further in the succeeding hybrid arrangement. By combining hybrid arrangements of this type in this manner a single programme source may be divided into a very large number of outlets each of which is arranged to serve a relatively small group of subscribers. The output terminals of each hybrid system are effectively isolated from each other, the balance of the third windings largely determining the high frequency isolation whilst the audio frequency isolation is determined by the value of the impedences 45. In this way a fault on one of the lines 5 between the programme exchange and a group of subscribers will affect only that group of subscribers and leave the remaining groups free to continue to receive the television programme.

I claim:

1. A wired broadcasting system including a hybrid arrangement having a pair of input terminals and four pairs of output terminals which includes two transformers each having a first winding, a second winding and a third, tapped, winding, the first windings of said transformers being connected in series between the pair of input terminals, the second windings being connected in series anti-phase between the terminals of an impedance and the third windings each being connected between one of each of a corresponding two of said four pairs of output terminals, the other terminal of each of said four pairs being connected to a common conductor, the tapping point of each third winding being connected to said common conductor through two impedences in series one of which has an impedance which is appreciable in the audio frequency range but is low in the high frequency range, and means for connecting in shunt with said one impedance an audio frequency signal source.

2. A wired broadcasting system as claimed in claim 1, wherein the audio frequency source is connected to said one impedance through a high frequency filter arrangement.

3. A wired broadcasting system as claimed in claim 2, wherein said one impedance is arranged to have one of its terminals connected to the common conductor.

4. A wired broadcasting system as claimed in claim 1, wherein the audio frequency signal source is applied to the input terminals of the hybrid arrangement and is coupled to its output terminals by means which include an impedance arranged in series with the input terminals which is appreciable over the audio frequency range but low in the high frequency range and a connection extending between said impedance and the junction between the series pairs of impedences connected between the tapping point on the third windings and the common conductor.

5. A wired broadcasting system as claimed in claim 4, wherein the impedance in series with the input terminals has one of its terminals connected to the common conductor thereby also simultaneously to form one of those associated with the high frequency filters through which the audio frequency signals are supplied across said one impedences which may also have one terminal connected to the common conductor and each form a further part of the corresponding high frequency filter.

6. A wired broadcasting system as claimed in claim 1, wherein the hybrid arrangement has associated with at least one of the output terminals thereof an impedance transformer the output impedance of which is arranged to feed the input terminals of a further hybrid arrangement, the impedance transformer having connected in series with its primary winding an impedance which is low in the high frequency range but is high in the audio frequency range, whilst its secondary winding is connected between an auxiliary output terminal and one of the junctions between the pairs of series impedences associated with the tapped third windings of the hybrid transformers.

* * * * *